US012810445B2

(12) United States Patent
Tsukahara

(10) Patent No.: US 12,810,445 B2
(45) Date of Patent: Nov. 24, 2026

(54) IMAGE PROCESSING DEVICE, IMAGING DEVICE, IMAGE PROCESSING METHOD, AND STORAGE MEDIUM

(71) Applicant: CANON KABUSHIKI KAISHA, Tokyo (JP)

(72) Inventor: Azusa Tsukahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 499 days.

(21) Appl. No.: 18/327,128

(22) Filed: Jun. 1, 2023

(65) Prior Publication Data

US 2024/0046488 A1 Feb. 8, 2024

(30) Foreign Application Priority Data

Aug. 4, 2022 (JP) ................................ 2022-124723

(51) Int. Cl.

*G06T 7/269* (2017.01)
*G06T 5/20* (2006.01)

(Continued)

(52) U.S. Cl.

CPC ................ *G06T 7/269* (2017.01); *G06T 5/20* (2013.01); *G06V 10/751* (2022.01); *G06V 10/761* (2022.01); *H04N 23/67* (2023.01)

(58) Field of Classification Search

CPC ........... G06T 7/269; G06T 5/20; G06T 7/593; G06V 10/751; G06V 10/761; H04N 23/67;

(Continued)

(56) References Cited

U.S. PATENT DOCUMENTS 5,406,642 A 4/1995 Maruya
2014/0218550 A1* 8/2014 Chuang .................. H04N 23/68 348/208.6
2020/0202558 A1* 6/2020 Lakemond ................ G06T 7/73

FOREIGN PATENT DOCUMENTS

JP H02-255990 A 10/1990
JP H04-271485 A 9/1992

(Continued)

OTHER PUBLICATIONS

Notice of Reasons for Refusal issued by the Japanese Patent Office on Mar. 26, 2024 in corresponding JP Patent Application No. 2022-124723, with English translation.

(Continued)

*Primary Examiner* — Stephen P Coleman
(74) *Attorney, Agent, or Firm* — Carter, DeLuca & Farrell LLP

(57) ABSTRACT

An image processing device that generates reliability of matching between a first image and a second image includes a pixel value change generation unit configured to set a standard image including a pixel of interest in the first image or the second image to generate at least a first pixel value change in a first direction and a second pixel value change in a second direction for each local region of the standard image, a gradient direction generation unit configured to generate a gradient direction of the local region based on the first pixel value change and the second pixel value change, a gradient direction correction unit configured to correct the gradient direction in accordance with the gradient direction, and a reliability generation unit configured to generate the reliability based on the gradient direction corrected by the gradient direction correction unit.

26 Claims, 13 Drawing Sheets

(51) Int. Cl.
*G06V 10/74* (2022.01)
*G06V 10/75* (2022.01)
*H04N 23/67* (2023.01)

(58) Field of Classification Search
CPC ........ H04N 23/95; H04N 23/50; H04N 23/55; H04N 23/70
USPC .......................................................... 382/107
See application file for complete search history.

(56) References Cited

FOREIGN PATENT DOCUMENTS

| | | |
|---|---|---|
| JP | 2007-041752 A | 2/2007 |
| JP | 2008-003674 A | 1/2008 |
| JP | 2011-182084 A | 9/2011 |

OTHER PUBLICATIONS

Extended European Search Report issued by the European Patent Office on Jan. 29, 2024 in corresponding EP Patent Application No. 23177956.2.

* cited by examiner

IMAGE PROCESSING DEVICE, IMAGING DEVICE, IMAGE PROCESSING METHOD, AND STORAGE MEDIUM

BACKGROUND OF THE INVENTION

Field of the Invention

The present invention relates to an image processing device that performs image matching, an imaging device, an image processing method, a storage medium, and the like.

Description of the Related Art

There is a block matching method as a method of acquiring a plurality of images and calculating three-dimensional information. In this method, first, for two images (hereinafter referred to as an A image and a B image) which are captured from different viewpoints, an arbitrary region 1 is set as a standard image in the A image. Then, a region 2 is set as a reference image in the B image, and the region 2 having the highest correlation with the region 1 is searched for while shifting the position of the region 2.

Then, a distance is calculated based on a positional deviation between the regions 1 and 2 when the correlation is the highest. Note that cross-correlation representing the degree of difference (or similarity) between regions of different images is used in the searching, and determination of similar regions is performed. This positional deviation is referred to as a parallax, and distance information can be obtained by using a known method such as triangulation.

Since a parallax occurs in the direction of deviation of a viewpoint between the A image and the B image, the searching for the region 2 is generally performed in only one direction in many cases. However, in practice, deviation may also occur in a direction different from a parallax occurrence direction assumed due to errors when assembling a device, distortion caused by an optical system, or the like. This deviation causes an error according to a subject when calculating the amount of parallax. For this reason, this error can be reduced by searching for the region 2 in a two-dimensional range (two-dimensional searching).

However, in the two-dimensional searching, an error may occur in a parallax calculation result in a specific region. For example, there may be an aperture problem in a region in which an error occurs. This is an error that occurs when a standard image has only a unidirectional feature (one-dimensional feature).

When the standard image has a one-dimensional feature, there are a plurality of positions of the reference image having the same texture as the standard image during block matching. Then, there is a possibility that a reference image at a position different from the original parallax position will be matched as an image most similar to the standard image, and in that case, a parallax value to be calculated includes an error.

On the other hand, Japanese Patent Application Laid-Open No. 2011-182084 discloses a method of determining whether or not a standard image is a region where an aperture problem occurs (aperture problem region) and calculating reliability. That is, it discloses a method of calculating a direction in which a pixel value changes for each local region in a standard image, and determining an aperture problem region when there is a small variance in the direction in which the pixel value changes in the entire standard image.

However, in the method disclosed in Japanese Patent Application Laid-Open No. 2011-182084, there is a concern that determination cannot be performed correctly when the standard image has a linear texture. In addition, when a texture with high contrast and a texture with low contrast are included, there is a concern that determination cannot be performed correctly.

SUMMARY OF THE INVENTION

An image processing device as one aspect of the present invention is an image processing device that generates a reliability of matching between a first image and a second image, the image processing device including at least one processor or circuit configured to function as a pixel value change generation unit configured to set a standard image including a pixel of interest in the first image or the second image to generate at least a first pixel value change in a first direction and a second pixel value change in a second direction for each local region of the standard image, a gradient direction generation unit configured to generate a gradient direction of the local region based on the first pixel value change and the second pixel value change, a gradient direction correction unit configured to correct the gradient direction in accordance with the gradient direction, and a reliability generation unit configured to generate the reliability based on the gradient direction corrected by the gradient direction correction unit.

Further features of the present invention will become apparent from the following description of embodiments with reference to the attached drawings.

BRIEF DESCRIPTION OF THE DRAWINGS

FIG. 7A is a functional block diagram schematically illustrating a configuration of a reliability calculation device 110 according to the first embodiment, and FIG. 7B is a flowchart showing operations of the reliability calculation device 110 according to the first embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1A:
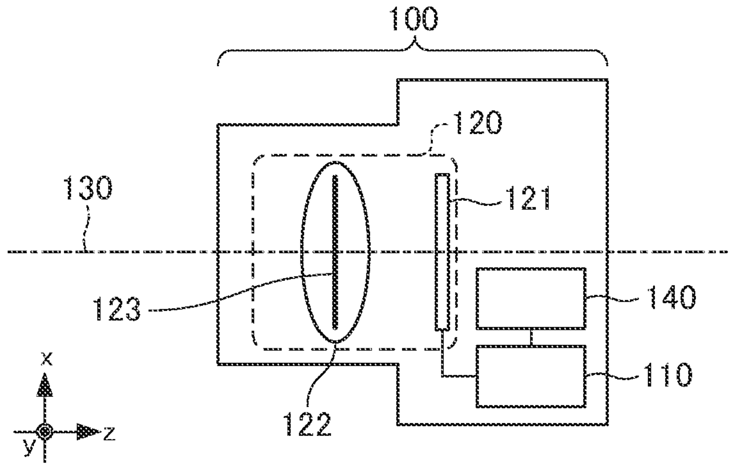
FIGS. 1A to 1C are diagrams illustrating an imaging device including a reliability calculation device according to a first embodiment of the present invention.
Figure 1B:
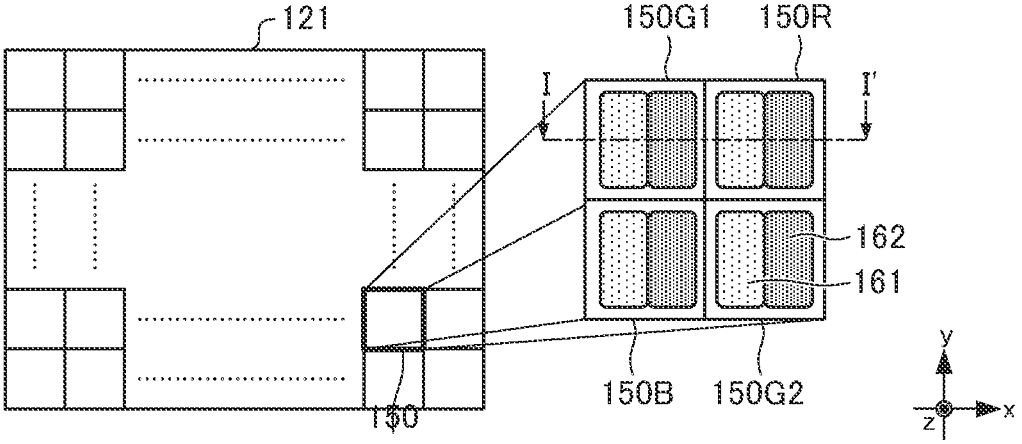
Figure 1C:
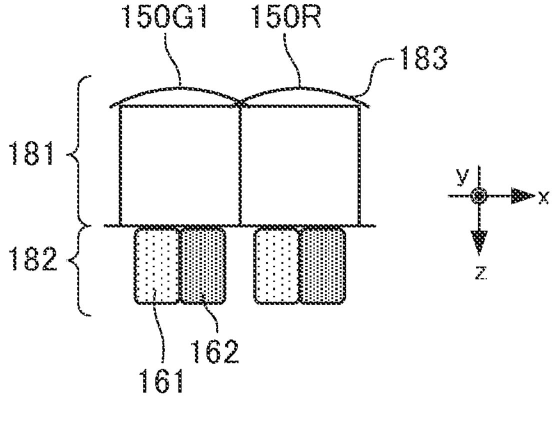

FIGS. 1A to 1C are diagrams illustrating an imaging device including a reliability calculation device according to a first embodiment of the present invention. FIG. 1A is a schematic diagram of an imaging device according to the first embodiment, in which the imaging device 100 includes a reliability calculation device 110, an imaging unit 120, and an image matching unit 140. Note that the imaging device 100 is provided with a CPU as a computer, which is not illustrated in the drawing, and a memory, which is not illustrated in the drawing, storing a computer program.

Here, the imaging device 100 functions as an image processing device that generates the reliability of matching between a first image and a second image. Note that the image matching unit 140 includes a measurement unit that measures a distance to a subject based on the reliability of matching between the first image and the second image.

The reliability calculation device 110 and the image matching unit 140 can be configured using logic circuits. The reliability calculation device 110 and the image matching unit 140 may be realized by causing the CPU provided in the imaging device 100 to execute the computer program stored in the memory.

The imaging unit 120 includes an imaging element 121 and an optical system 122. The optical system 122 is an imaging lens of the imaging device 100 and has a function of forming an image of a subject on the imaging element 121. The optical system 122 is constituted by a plurality of lens groups (not illustrated), a diaphragm (not illustrated), and the like, and includes an exit pupil 123 at a position a predetermined distance away from the imaging element 121.

Note that, in the present embodiment, a z-axis is parallel to the optical axis 130 of the optical system 122, and an x-axis and a y-axis are perpendicular to each other and perpendicular to the z-axis. Note that the optical system 122 is provided with a focus adjustment unit, which is not illustrated in the drawing, adjusting the focus of the optical system based on information on a distance to the subject which is output from the image matching unit 140.

The imaging element 121 is constituted by an image sensor of a complementary metal oxide semiconductor (CMOS) or a charge coupled device (CCD). A subject image formed on the imaging element 121 via the optical system 122 is photoelectrically converted by the imaging element 121 to generate an image signal based on a subject image.

FIG. 1B is a diagram illustrating an example of an xy cross-section of the imaging element 121. The imaging element 121 is configured by arranging a plurality of pixel groups 150 of 2 rows×2 columns in a two-dimensional pattern. In the pixel group 150, green pixels 150G1 and 150G2 are arranged diagonally, and red pixels 150R and blue pixels 150B are arranged at the other two pixels.

FIG. 1C is a diagram schematically illustrating an I-I' cross-section of the pixel group 150. Each pixel is constituted by a light receiving layer 182 and a light guiding layer 181. A pair of photoelectric conversion units (a photoelectric conversion unit 161 as a first photoelectric conversion unit and a photoelectric conversion unit 162 as a second photoelectric conversion unit) for photoelectrically converting received light are disposed in the light receiving layer 182.

The light guiding layer 181 includes a microlens 183 for efficiently guiding light flux incident on pixels to the photoelectric conversion units, a color filter (not illustrated) that transmits light in a predetermined wavelength band, wirings for image reading (not illustrated), and wirings for driving pixels (not illustrated), and the like are disposed therein.

In addition, photoelectric conversion signals of pixels are read out via the wirings and are AD-converted into image signals, which are input to the reliability calculation device 110. FIGS. 1B and 1C illustrate examples of a pair of photoelectric conversion units divided into two parts in one pupil division direction (x-axis direction). However, depending on specifications, for example, four photoelectric conversion units divided in two pupil division directions (x-axis direction and y-axis direction) may be provided, and the pupil division direction and the number of divisions are arbitrary.

Figure 2:
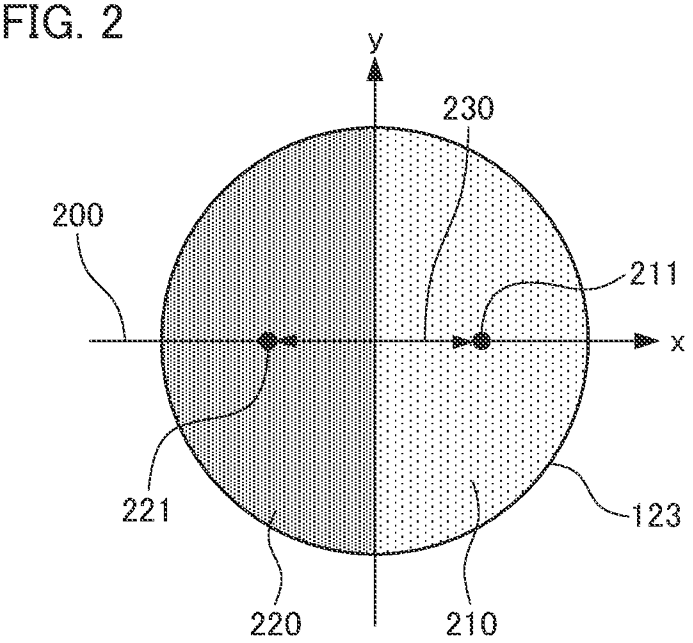
FIG. 2 is a diagram illustrating an exit pupil 123 of an optical system 122 when viewed from an intersection (center image height) between an optical axis 130 and an imaging element 121.

FIG. 2 is a diagram illustrating the exit pupil 123 of the optical system 122 when seen from an intersection (center image height) of the optical axis 130 and the imaging element 121. A first light flux passing through a first pupil region 210 and a second light flux passing through a second pupil region 220, which are different regions of the exit pupil 123, are incident on the photoelectric conversion units 161 and 162, respectively.

The photoelectric conversion unit 161 and the photoelectric conversion unit 162 in each pixel can photoelectrically convert an incident light flux to generate photoelectric conversion signals corresponding to an A image (first image) and a B image (second image), respectively.

That is, the plurality of photoelectric conversion units 161 as first photoelectric conversion units generate a first image, and the plurality of photoelectric conversion units 162 as second photoelectric conversion units generate a second image. A generated photoelectric conversion signal is AD-converted into an image signal, which is input to the reliability calculation device 110.

FIG. 2 illustrates the center-of-gravity position of the first pupil region 210 (first center-of-gravity position 211) and the center-of-gravity position of the second pupil region 220 (second center-of-gravity position 221). In the present embodiment, the first center-of-gravity position 211 is eccentric (moved) along a first axis 200 from the center of the exit pupil 123.

On the other hand, the second center-of-gravity position 221 is eccentric (moves) along the first axis 200 in a direction opposite to that of the first center-of-gravity position 211. The direction of the first axis 200 connecting the first center-of-gravity position 211 and the second center-of-gravity position 221 is referred to as a pupil division direction. In addition, a distance between the centers of gravity of the first center-of-gravity position 211 and the second center-of-gravity position 221 is a baseline length 230.

Next, the reliability calculation device 110 of the present embodiment will be described. The reliability calculation device 110 acquires image information and calculates a reliability indicating the likelihood of a matching result between the image and another image.

Figure 3:
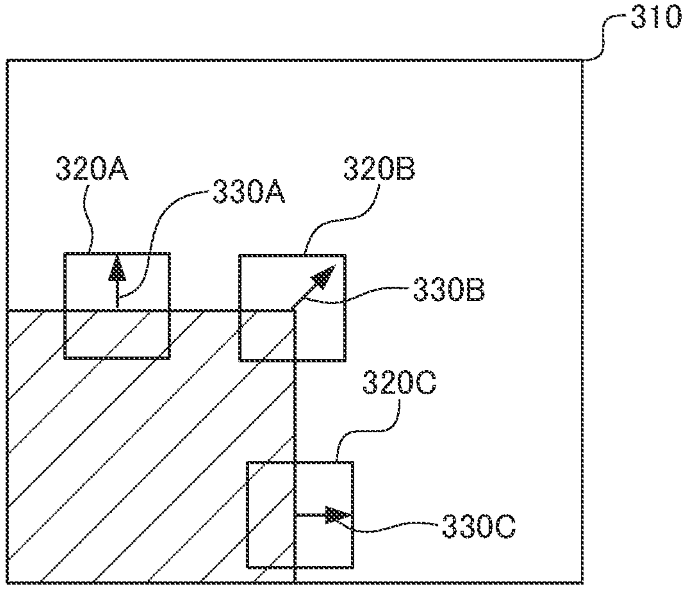
FIG. 3 is a diagram illustrating a pixel value change in a non-aperture problem region in the first embodiment.
Figure 4:
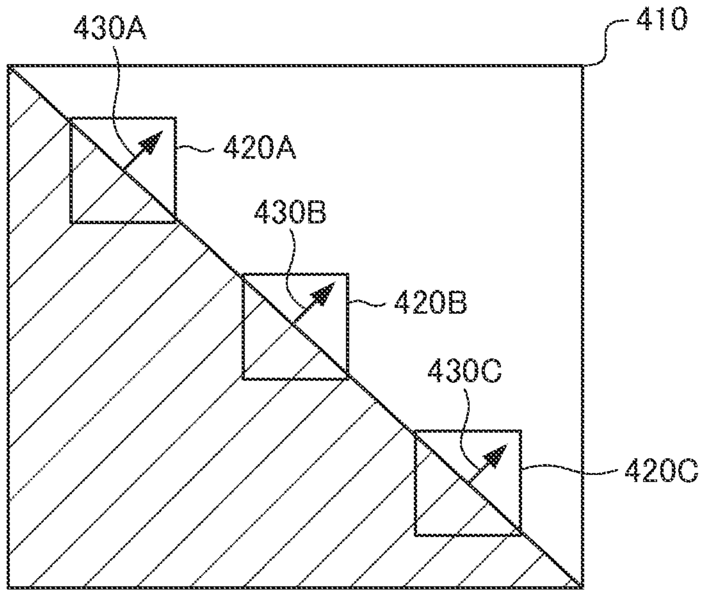
FIG. 4 is a diagram illustrating a pixel value change in an aperture problem region in the first embodiment.

First, features of gradient directions of an aperture problem region and a non-aperture problem region will be described with reference to FIGS. 3 and 4. FIG. 3 is a diagram illustrating a pixel value change in the non-aperture problem region according to the first embodiment, and FIG. 4 is a diagram illustrating a pixel value change in the aperture problem region according to the first embodiment. Two types of standard images that are set in an image acquired using the imaging device 100 are shown as a standard image 310 in FIG. 3 and a standard image 410 in FIG. 4.

Reference numerals 320A, 320B, and 320C in FIG. 3 denote local regions within the standard image 310. In addition, reference numerals 330A, 330B, and 330C in the drawing denote gradient directions. Note that the gradient directions will be described later with reference to FIG. 9. In addition, reference numerals 420A, 420B, and 420C in FIG. 4 denote local regions in the standard image 410. In addition, reference numerals 430A, 430B, and 430C in the drawing denote gradient directions in the standard image 410.

Here, the case of a non-aperture problem region will be described using the standard image 310 in FIG. 3. A gradient direction 330A, a gradient direction 330B, and a gradient direction 330C in FIG. 3 indicate different directions. Thus, in the standard image 310, the uniformity of the gradient directions is low. In a case where the uniformity of the gradient directions is low in this manner, it can be determined to be a non-aperture problem region.

On the other hand, the case of an aperture problem region will be described using the standard image 410 in FIG. 4. A gradient direction 430A, a gradient direction 430B, and a gradient direction 430C indicate the same direction. Thus, in the standard image 410, the uniformity of the gradient directions is high. By evaluating the uniformity of the gradient directions in this manner, it can be determined whether it is an aperture problem region. That is, when the uniformity of the gradient directions is high, it can be determined to be an aperture problem region.

Figure 5:
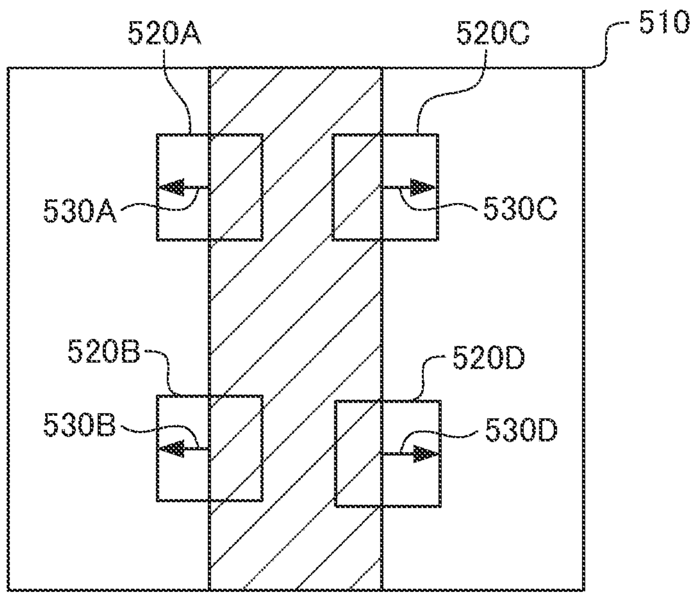
FIG. 5 is a diagram illustrating a pixel value change in a linear texture in the first embodiment.
Figure 6:
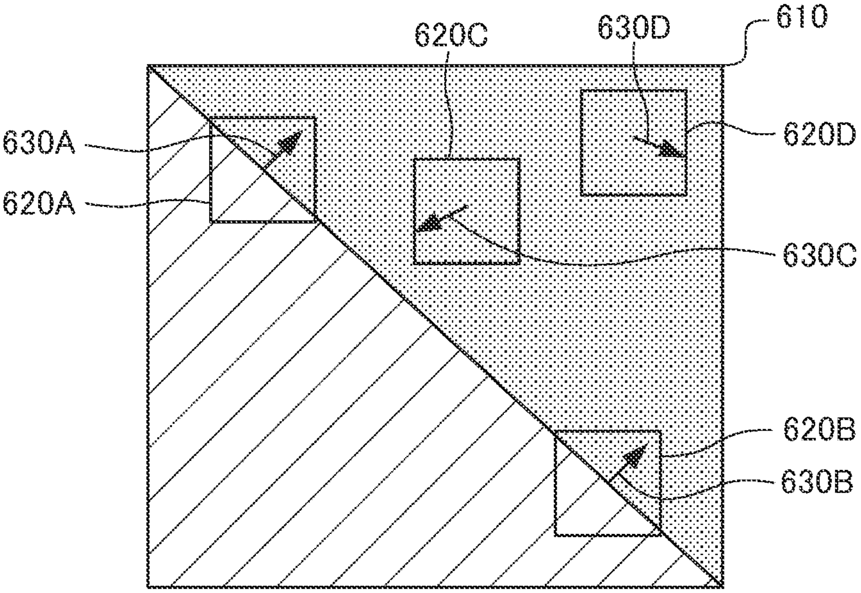
FIG. 6 is a diagram illustrating a pixel value change when a texture with high contrast and a texture with low contrast are included in the first embodiment.

Next, a problem to be solved in the present invention will be described. FIG. 5 is a diagram illustrating a pixel value change in a linear texture according to the first embodiment, and FIG. 6 is a diagram illustrating a pixel value change in a case where a texture with high contrast and a texture with low contrast are included in the first embodiment. Two types of standard images set in an image acquired using the imaging device 100 are shown as a standard image 510 in FIG. 5 and a standard image 610 in FIG. 6.

The case of an aperture problem region, which is a problem, will be described using the standard image 510. There is a linear region having a small pixel value in the central portion of the standard image 510. A local region 520A, a local region 520B, a local region 520C, and a local region 520D are set in the standard image 510. In addition, the gradient directions of the respective local regions are indicated by a local region 530A, a local region 530B, a local region 530C, and a local region 530D.

In the local regions 520A and 520B, the gradient directions thereof are leftward. On the other hand, in the local regions 520C and 520D, the gradient directions thereof are rightward. In this manner, there are local regions with different gradient directions in the standard image 510, and the uniformity of the gradient directions is reduced. Thus, there is a strong possibility that the standard image 510 is erroneously determined to be a non-aperture problem region.

The case of another aperture problem region will be described using standard image 610. The standard image 610 is an image in which strong and weak textures are mixed. A region having a small pixel value is located on a lower left side in the standard image 610.

An upper right portion of the standard image 610 has a pixel value larger than that of a lower left portion, and a small pixel value varies randomly. When matching is performed with such an image, a boundary portion between the lower left portion and the upper right portion of the standard image 610 with high contrast becomes dominant for a result, and becomes aperture problem regions, similar to the standard image 410 in FIG. 4.

Here, a local region 620A, a local region 620B, a local region 620C, and a local region 620D are set in the standard image 610. Gradient directions of the respective local regions are indicated by a local region 630A, a local region 630B, a local region 630C, and a local region 630D. In the local regions 620A and 620B having a region in a boundary portion between the lower left portion and the upper right portion of the standard image 610, the gradient directions thereof are upward and rightward.

On the other hand, in the local regions 620C and 620D located on the upper right side of the standard image 610, the gradient directions thereof are random. In this manner, there are local regions with different gradient directions, and the uniformity of the gradient directions in the standard image 610 is reduced. Thus, there is a strong possibility that the standard image 610 is erroneously determined to be a non-aperture problem region.

Figure 7A:
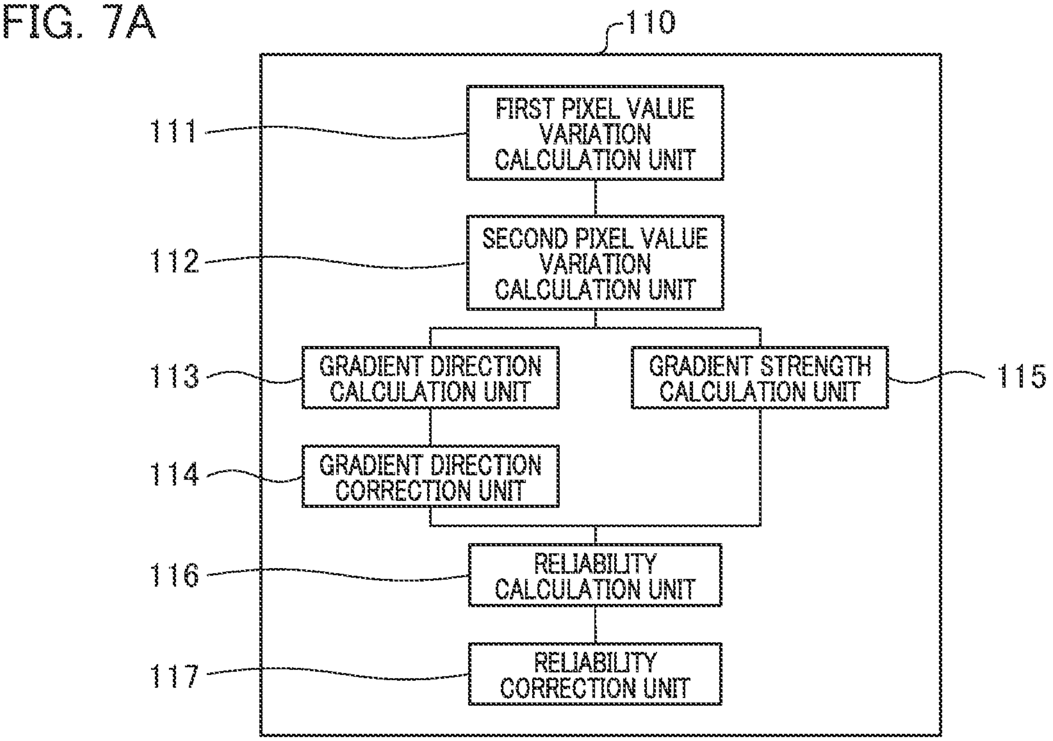
FIGS. 7A and 7B are diagrams illustrating the reliability calculation device according to the first embodiment.
Figure 7B:
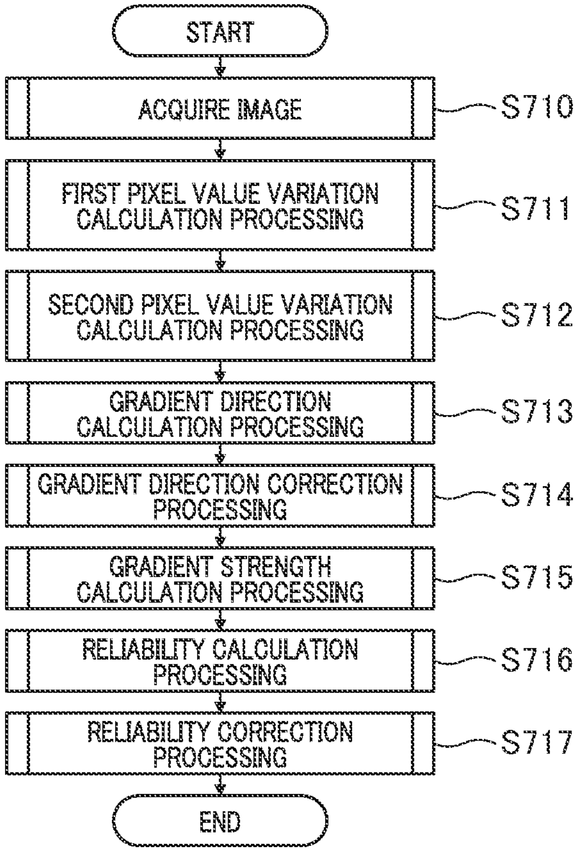

FIGS. 7A and 7B are diagrams illustrating the reliability calculation device according to the first embodiment, and FIG. 7A is a functional block diagram schematically illustrating a configuration of the reliability calculation device 110 according to the first embodiment.

In FIG. 7A, the reliability calculation device 110 includes a first pixel value variation calculation unit 111, a second pixel value variation calculation unit 112, a gradient direction calculation unit 113, a gradient direction correction unit 114, a gradient strength calculation unit 115, a reliability calculation unit 116, and a reliability correction unit 117.

Note that some of the functional blocks illustrated in FIG. 7A are realized by causing the above-mentioned CPU included in the imaging device to execute a computer program stored in a memory as a storage medium. However, some or all of them may be realized by hardware.

As the hardware, a dedicated circuit (ASIC), a processor (reconfigurable processor, DSP), or the like can be used. In addition, each of the functional blocks illustrated in FIG. 7A may not be built in the same housing, and may be constituted by separate devices connected to each other via signal paths.

FIG. 7B is a flowchart showing operations of the reliability calculation device 110 according to the first embodiment. Note that the operation of each step in the flowchart of FIG. 7B is performed by causing the CPU as a computer in the imaging device 100 to execute the computer program stored in the memory.

When the image processing according to the first embodiment is started, the processing proceeds to step S710. In step S710, the CPU performs imaging using the imaging device 100, generates and acquires an image, and stores the acquired image in a main body memory (not illustrated). Note that either the A image or the B image may be acquired.

The image acquired in step S710 may be subjected to processing for correcting imbalance of the amount of light which is caused mainly by vignetting of the optical system 122. Specifically, based on a result obtained by imaging a surface light source with uniform luminance in the imaging device 100, a correction value is stored in the memory in advance so that a luminance value of the image is set to a substantially constant value regardless of an angle of view.

By correcting the image acquired in step S710 based on the correction values stored in the memory, it is possible to correct unevenness in light amount balance.

Further, for example, in order to reduce the influence of an optical shot noise or the like generated in the imaging element 121, the acquired image may be subjected to filtering of a band-pass filter, a low-pass filter, or the like. In addition, the image may be scaled down to reduce computational costs. Alternatively, the resolution of the image may be increased by a known method in order to calculate the reliability with higher resolution.

In step S711, the CPU causes the first pixel value variation calculation unit 111 to calculate a first pixel value variation. Specifically, in step S711, an image of a partial region including a pixel (pixel of interest) for which reliability of matching is to be calculated is set as a standard image. Then, a plurality of partial regions in the standard image are set as local regions, and a pixel value variation (first pixel value variation) in any direction of each local region is calculated.

Figure 8:
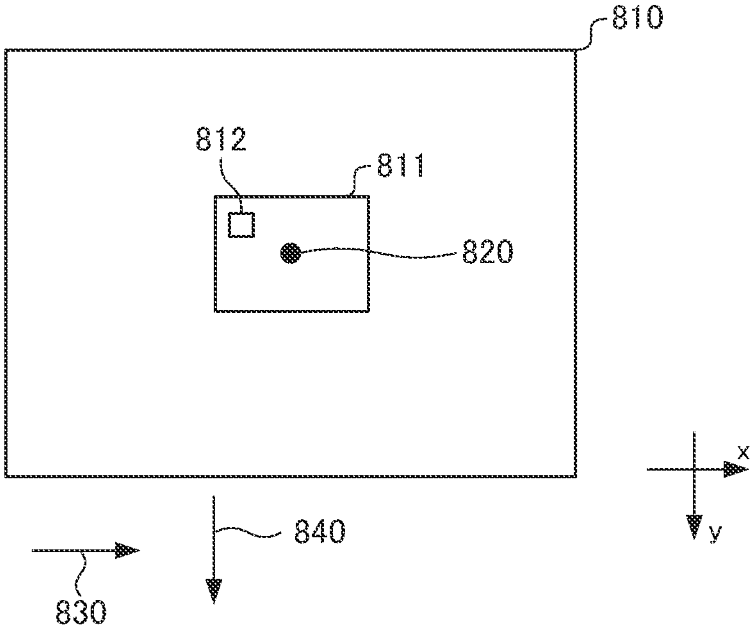
FIG. 8 is a diagram illustrating a positional relationship between a standard image set in step S711 and a local region.

FIG. 8 is a diagram illustrating a positional relationship between the standard image and the local region set in step S711, and reference numeral 810 denotes the image acquired in step S710. In step S711, the first pixel value variation calculation unit 111 calculates a pixel value variation in each of a plurality of local regions of the standard image.

Specifically, first, the first pixel value variation calculation unit 111 extracts a partial region including the pixel of interest 820 and its surroundings from the image 810, and sets it as a standard image 811. Next, a plurality of partial regions 812 are extracted from the standard image 811 and are set as local regions 812A, 812B, . . . . A method of setting the partial region 812 as a partial region will be described below.

Next, a first direction 830, which is the direction in which a pixel value change is calculated, will be set. At this time, the direction in which a pixel value change is calculated may be any direction. By setting a direction along a pixel array, it is possible to easily calculate a pixel value variation, which will be described later. Thus, description will be given below on the assumption that the first direction 830 is the x-axis direction.

Next, a pixel value variation along the first direction 830 will be calculated. The pixel value variation may be calculated using any known method as long as a pixel value variation of a local region along the first direction 830 can be evaluated.

For example, a Sobel filter or a Prewitt filter may be applied to calculate the pixel value variation. Alternatively, the pixel value variation may be calculated using a central differential gradient or an intermediate differential gradient of the local region. In the central differential gradient, a gradient of a pixel is a weighted difference between neighboring pixels. In the intermediate differential gradient, a gradient of a pixel is a difference between an adjacent pixel and the current pixel.

Subsequently, in step S712 in FIG. 7, the CPU causes the second pixel value variation calculation unit 112 to calculate pixel value variations (second pixel value variation) of pixel values in the local regions 812A and 812B along a second direction 840. Specifically, the second pixel value variation calculation unit 112 first sets the second direction 840, which is a direction in which a pixel value change is calculated. At this time, the second direction 840 may be any direction different from the first direction 830.

By setting a direction along a pixel array, it is possible to easily calculate a pixel value variation which will be described later. In addition, by setting a second direction orthogonal to the first direction 830, it is possible to easily perform calculation by the gradient direction calculation unit 113 and the gradient strength calculation unit 115, which will be described later. In addition, description will be given below on the assumption that the second direction 840 is a y-axis direction.

Next, a pixel value variation along the second direction 840 will be calculated. The pixel value variation may be calculated using any known method as long as a variation of a pixel value of the local region in the second direction 840 can be evaluated. For example, the pixel value variation may be calculated by applying either a Sobel filter or a Prewitt filter to calculate a differential value.

Alternatively, a first differential value and a second differential value may be calculated using the central differential gradient or the intermediate differential gradient of the local region. In this manner, at least two directions of a first direction and a second direction are set, and the first differential value obtained by performing differentiation processing in the first direction and the second differential value obtained by performing differentiation processing in the second direction may be calculated. In addition, a first pixel value change may be generated based on the first differential value, and a second pixel value change may be generated based on the second differential value.

Note that steps S711 and S712 function as a pixel value change generation step in which a standard image including a pixel of interest in a first image or a second image is set to generate a first pixel value change and a second pixel value change along at least two directions for each local region of the standard image. These two directions are referred to as a first direction and a second direction, respectively. In addition, at this time, the first pixel value variation calculation unit 111 and the second pixel value variation calculation unit 112 function as a pixel value change generation unit.

Subsequently, in step S713 in FIG. 7B, the CPU causes the gradient direction calculation unit 113 to calculate a direction in which a pixel value of a local region changes by any known method.

Figure 9:
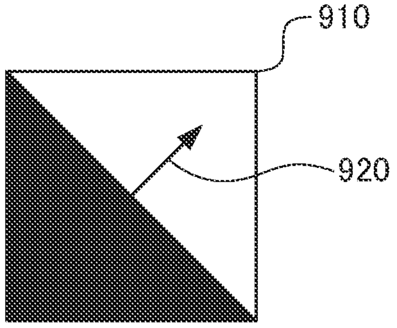
FIG. 9 is a diagram illustrating a gradient direction calculation unit according to the first embodiment.

First, a direction in which a pixel value changes will be described with reference to FIG. 9. FIG. 9 is a diagram illustrating the gradient direction calculation unit according to the first embodiment and illustrates a local region 910 and its pixel value. A lower left region of the local region 910 has a small pixel value, and an upper right region of the local region 910 has a large pixel value. A direction orthogonal to a boundary between the pixel values is a gradient direction 920 of the local region 910.

The gradient direction calculation unit 113 calculates a gradient direction based on a first pixel value change and a second pixel value change. That is, the gradient direction is calculated with a vector having a first component and a second component calculated from the first pixel value change and the second pixel value change. Specifically, a pixel value change dx in the x-axis direction along a pixel value array is calculated from the first direction 830 and the first pixel value variation.

In addition, a pixel value change dy in the y-axis direction orthogonal to the x-axis direction is calculated from the second direction 840 and the second pixel value variation. From the pixel value change dx in the x-axis direction and the pixel value change dy in the y-axis direction, a gradient direction is calculated as a vector using the following Equation 1 below.

$$v=(dx, dy) \quad \text{[Equation 1]}$$

Alternatively, the following Equation 2, which is obtained by normalizing Equation 1 by the magnitude of a gradient, may be calculated as a gradient vector v'.

$$v'=\left(dx/\sqrt{dx^2+dy^2},\ dy/\sqrt{dx^2+dy^2}\right) \quad \text{[Equation 2]}$$

Here, step S713 functions as a gradient direction generation step of generating a gradient direction of a local region based on the first pixel value change and the second pixel value change. At this time, the gradient direction calculation unit 113 functions as a gradient direction generation unit.

Figure 10:
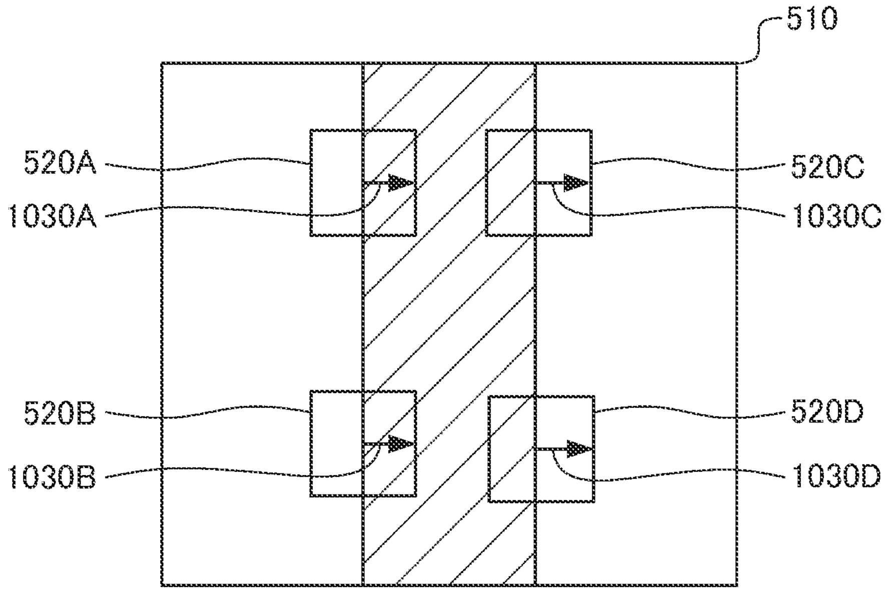
FIG. 10 is a diagram illustrating processing of step S714 performed by a gradient direction correction unit according to the first embodiment.

Subsequently, in step S714 of FIG. 7, the CPU corrects the gradient direction calculated in step S713. An effect of the processing of step S714 will be described. FIG. 10 is a diagram illustrating the processing of step S714 which is performed by the gradient direction correction unit according to the first embodiment. In step S714, a gradient is corrected such that the gradient has the same value even when a local region is point-symmetrically moved, and the corrected gradient direction is calculated.

In FIG. 10, when the local regions 520A and 520B are point-symmetrically moved, they have the same texture as the local regions 520D and 520C, respectively. Thus, in step S714, correction is performed such that the corrected gradient directions of these local regions are all the same. For example, a corrected gradient direction 1030A is corrected as 1030D.

When the processing of step S716, which will be described later, is performed using the corrected gradient direction which has been corrected in this manner, a low reliability is calculated. Thus, the standard image 510 is correctly determined to be an aperture problem region. This is because the uniformity of the gradient direction is set to be reliability by evaluating values such as a variance in step S716, and the reliability is calculated to be low when a variation in a direction is low, such as point-symmetrical corrected gradient directions 1030A to 1030D.

In this manner, in step S714, a pixel value gradient direction is corrected based on the gradient direction of the local region (based on, for example, positive or negative values of the first pixel value change and the second pixel value change) for the standard image as illustrated in FIG. 10. Thereby, a correct reliability can be calculated in the subsequent step S716, so that it can be determined that the region is an aperture problem region.

Specifically, first, a reference direction is set. Any direction may be used as the reference direction. Since correction to be described later can be easily performed by setting a direction along the pixel value array, description will be given below on the assumption that a reference direction is the +x-axis direction. A range from −90° to +90° is set as a usable range with the reference direction as 0°. That is, a pixel value gradient direction is calculated from a ratio between the first pixel value change and the second pixel value change, and a usable range of 180° is determined.

Next, it is determined whether the gradient direction calculated in step S713 is within the usable range. For example, a gradient angle θ, which is an angle formed with the positive direction of the x-axis, is calculated from a ratio between a first component and a second component of the gradient vector v or the gradient vector v'. For example, in the case of FIG. 5, gradient angles θ of the local regions 520A and 520B are 180°, and gradient angles θ of the local regions 520C and 520D are 0°.

Next, it is determined whether the gradient angle θ falls within the usable range of −90° to +90°. When the gradient angle θ does not fall within the usable range, that is, when a pixel value gradient direction falls outside a predetermined usable range, the gradient angle θ is corrected by correcting the pixel value gradient direction by +180° or −180° so that it falls within the usable range.

For example, in the case of FIG. 5, since the gradient angles θ of the local regions 520A and 520B do not fall within the usable range, a point-symmetrical corrected gradient angle θp is set to 0° by subtracting 180° as in the corrected gradient direction 1030A and the corrected gradient direction 1030B of FIG. 10.

On the other hand, since the gradient angles θ of the local regions 520C and 520D fall within the usable range, the point-symmetrical corrected gradient angle θp is set to 0°, which is the same as the original gradient angle θ, as in the corrected gradient directions 1030C and 1030D in FIG. 10 without changing the angle.

Note that the pixel value gradient direction may be calculated by narrowing the range so that it falls within the usable range from the ratio between the first pixel value change and the second pixel value change.

Regarding the point-symmetrical corrected gradient angle θp, a point-symmetrical corrected gradient vector vp obtained by correcting the gradient vector v or the gradient vector v', or a point-symmetrical corrected gradient vector vp' obtained by normalizing the point-symmetrical corrected gradient vector vp can be calculated using the following Equations 3 and 4.

$$vp=\sqrt{dx^2+dy^2}\,(\cos\theta p, \sin\theta p) \quad \text{[Equation 3]}$$

$$vp'=(\cos\theta p, \sin\theta p) \quad \text{[Equation 4]}$$

Alternatively, when a first component a is negative, it is determined to be a usable region, the signs of the first component a and a second component b may be inverted to calculate a range-corrected first component of and a range-corrected second component bf.

Furthermore, correction is performed for loss of continuity in a gradient direction due to the determination of a usable range. Specifically, when Equations 3 and 4 are calculated, the calculation is performed after doubling θ. That is, the correction is performed such that an angle in a pixel value gradient direction is doubled. Then, the double-angle corrected gradient vector vd or the double-angle corrected gradient vector vd' obtained by normalizing the double-angle corrected gradient vector vd may be calculated.

A first component ap and a second component bp of the point-symmetrical corrected gradient vector vp satisfy the following Equations 5 and 6. Further, the double-angle corrected gradient vector vd may be calculated from the following Equation 9 or Equation 10 by using the fact that the following Equations 7 and 8 can be expressed using a double-angle formula. In a similar way of thinking, the double-angle corrected gradient vector vd' may be calculated from a first component ap' and a second component bp' of the point-symmetrical corrected gradient vector vp'.

$$\cos\theta p = \frac{ap}{\sqrt{ap^2 + bp^2}} \quad \text{[Equation 5]}$$

$$\sin\theta p = \frac{bp}{\sqrt{ap^2 + bp^2}} \quad \text{[Equation 6]}$$

$$\cos 2\theta p = 1 - 2\sin^2\theta p = 1 - \frac{2bp^2}{ap^2 + bp^2} = \frac{ap^2 - bp^2}{ap^2 + bp^2} \quad \text{[Equation 7]}$$

$$\sin 2\theta p = 2\sin\theta p\cos\theta p = \frac{2\,a\,p\,b\,p}{ap^2 + bp^2} \quad \text{[Equation 8]}$$

$$vd = \sqrt{ap^2 + bp^2}\left(1 - \frac{2bp^2}{ap^2 + bp^2}, \frac{2\,a\,p\,b\,p}{ap^2 + bp^2}\right) = \sqrt{ap^2 + bp^2}\left(\frac{ap^2 - bp^2}{ap^2 + bp^2}, \frac{2\,a\,p\,b\,p}{ap^2 + bp^2}\right) \quad \text{[Equation 9]}$$

[Equation 10]

$$vd' = \left(1 - \frac{2bp'^2}{ap'^2 + bp'^2}, \frac{2\,a\,p'\,b\,p'}{ap'^2 + bp'^2}\right) = \left(ap'^2 - bp'^2, 2\,a\,p'\,b\,p'\right)$$

Here, step S714 functions as a gradient direction correction step of correcting the gradient direction in accordance with a gradient direction.

Subsequently, in step S715 of FIG. 7, the CPU causes the gradient strength calculation unit 115 to calculate the strength of changes in the pixel values of the local regions 812A and 812B by any known method. Specifically, at least one of the sum, a maximum value, an average value, the sum of squares, or the square root of the sum of squares of a first pixel value variation and a second pixel value variation may be calculated as a gradient strength. Note that, as will be described later, this gradient strength may be used as a weight.

Alternatively, the sum, a maximum value, an average value, the sum of squares, or the square root of the sum of squares of a first component and a second component of the gradient vector vp or the double-angle corrected gradient vector vd may be calculated as a gradient strength. Note that this is the same value as when the first pixel value variation and the second pixel value variation are used.

Subsequently, in step S716 in FIG. 7, the CPU causes the reliability calculation unit 116 to calculate the uniformity of the gradient directions of the respective local regions in the standard image as a reliability by any known method. Specifically, first, a gradient direction is acquired from each local region set in the standard image. This gradient direction may be corrected in step S714. Further, the gradient strength calculated in step S715 may also be acquired.

Next, for the plurality of gradient directions acquired, at least one of a variance value, a weighted variance value, a standard deviation value, or a weighted standard deviation value is set as uniformity, and the larger these values become, the higher the reliability is calculated.

Alternatively, at least one of the value of an average composite vector length in the gradient direction, a weighted average composite vector length, a squared value of the average composite vector length, or a squared value of the weighted average composite vector length is set as uniformity, and the smaller these values become, the higher the reliability is calculated.

Here, a variance and a standard deviation in the gradient direction will be described. Here, the gradient direction is data that can be expressed by an angle, and the angle has periodicity. For this reason, the variance and the standard deviation cannot be obtained by general statistical processing.

Here, description is given on the assumption that the gradient vector v' normalized by the magnitude of the gradient has been acquired as the gradient direction. Assuming n pieces of data from v'1 to v'n as gradient vector data, a variance and a standard deviation thereof are obtained. Note that a first component a' and a second component b' in each data are assumed to be a1' to an' and b1' to bn'.

A composite vector R' of v'1 to v'n can be obtained using the following Equation 11.

$$R' = \sum_{i=1}^{n} v_i' = \sum_{i=1}^{n} (a_i', b_i') \quad \text{[Equation 11]}$$

Further, the composite vector R' can be divided by the number of pieces of data n to calculate an average composite vector Rm'. This can be converted as shown in the following Equation 12 using the length of the average composite vector Rm' (average composite vector length) Rmlen' and an angle (average composite vector angle) φ.

$$Rm' = \frac{R'}{n} = Rm'_{len}(\cos\phi, \sin\phi) \quad \text{[Equation 12]}$$

Using the average composite vector length Rmlen', a variance V' is defined by the following Equation 13, and a standard deviation S' is defined by the following Equation 14 below. Note that the variance V' and the standard deviation S' have values from 0 to 1, which indicates that, as the value becomes closer to 1, the degree of scattering of data becomes higher.

$$V' = 1 - R'_{len} \ (0 \le V \le 1) \quad \text{[Equation 13]}$$

$$S' = \sqrt{-2\log(R'_{len})} \ (0 \le S \le 1) \quad \text{[Equation 14]}$$

Here, the average composite vector length Rmlen' is calculated using the following Equations 15 to 17.

$$Rm'_{len} = \sqrt{Cval'^2 + Sval'^2} \quad \text{[Equation 15]}$$

$$Cval' = \frac{\sum_{i=1}^{n} a_i'}{n} \quad \text{[Equation 16]}$$

$$Sval' = \frac{\sum_{i=1}^{n} b_i'}{n} \quad \text{[Equation 17]}$$

In addition, a method of calculating a weighted variance and standard deviation will be described. Weights in each data are assumed to be w1 to wn. The weighted average composite vector length Rwlen' is calculated using the following Equations 18 to 20.

$$Rw'_{len} = \sqrt{Cvalw'^2 + Svalw'^2} \quad \text{[Equation 18]}$$

$$Cvalw' = \frac{\sum_{i=1}^{n} a'_i w_i}{\sum_{i=1}^{n} w_i} \quad \text{[Equation 19]}$$

$$Svalw' = \frac{\sum_{i=1}^{n} b'_i w_i}{\sum_{i=1}^{n} w_i} \quad \text{[Equation 20]}$$

A weighted variance Vw' or a weighted standard deviation Sw' can be calculated by the same method as in Equation 13 or Equation 14 by using the weighted average composite vector length Rwlen' instead of the average composite vector length Rmlen'.

Note that a case where the gradient vector v is acquired as a gradient direction will be described. A first component a and a second component b in each data are assumed to be a1 to an and b1 to bn. An average composite vector length Rlen is represented by the following Equations 21 to 23.

$$R_{len} = \sqrt{Cval^2 + Sval^2} \quad \text{[Equation 21]}$$

$$Cval = \frac{\sum_{i=1}^{n} \frac{a_i}{\sqrt{a_i^2 + b_i^2}}}{n} \quad \text{[Equation 22]}$$

$$Sval = \frac{\sum_{i=1}^{n} \frac{b_i}{\sqrt{a_i^2 + b_i^2}}}{n} \quad \text{[Equation 23]}$$

A variance V or a standard deviation S can be calculated by the same method as in Equation 13 or Equation 14 by using the average composite vector length Rlen instead of the average composite vector length Rmlen'.

Here, the average composite vector length R'len, the weighted average composite vector length Rw'len, the square of the average composite vector length R'len, or the square of the weighted average composite vector length Rw'len is also a numerical value that indicates the degree of scattering of each data. These have values from 0 to 1, which indicates that, as the value becomes closer to 0, the degree of scattering of data becomes higher. In this case, the calculation can be performed with simpler processing.

At this time, the gradient strength may be used as a weight. For example, a greater weight may be given to a greater gradient strength. Alternatively, a weight of 1 may be assigned only to gradient strengths of a certain level or more, and a weight of 0 may be assigned to gradient strengths of less than the certain level. Alternatively, a weight of 1 is assigned to only a large gradient strength when compared within the reference region, and a weight of 0 may be assigned to gradient strengths of less than the certain level.

Figure 11:
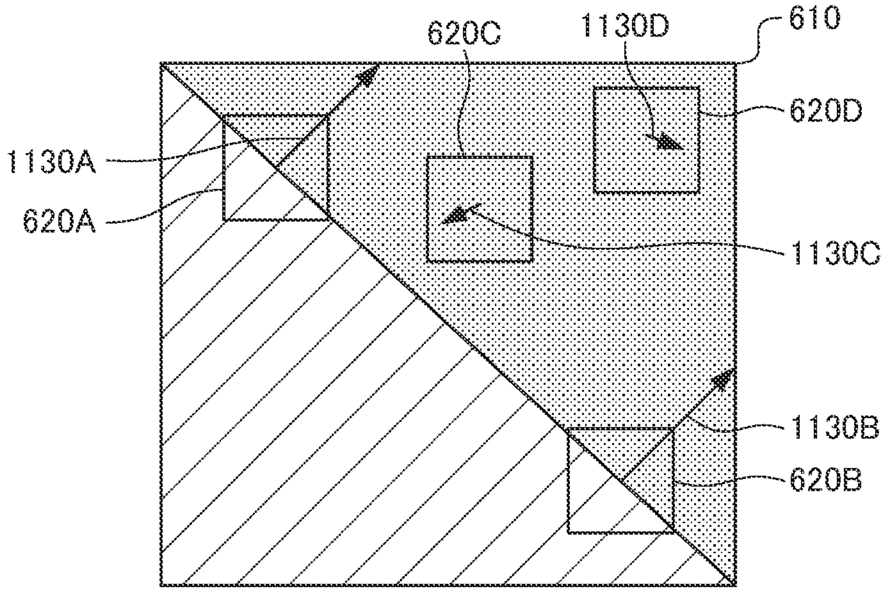
FIG. 11 is a diagram illustrating effects of processing in the reliability calculation unit according to the first embodiment.

Next, in step S716, the weighted variance in the gradient direction, the weighted standard deviation, the weighted average composite vector length, or the square of the weighted average composite vector length is set as uniformity, and an effect of using a gradient strength as a weight will be described. FIG. 11 is a diagram illustrating an effect of processing performed by the reliability calculation unit according to the first embodiment.

In FIG. 11, the local regions 620A and 620B have a weight greater than those of the local regions 620C and 620D. Here, a gradient direction 1130A and a gradient direction 1130B are the same direction. Thus, when the uniformity of a gradient direction is evaluated in consideration of a weight, a high uniformity is calculated. That is, it can be correctly determined that the standard image 610 is an aperture problem region.

Note that the above-described effect can be obtained either when the gradient direction calculated in step S713 is used or when the gradient direction corrected in step S714 is used. Any of the above-described methods may be used to calculate reliability, but calculation processing can be simplified by using appropriate weights in step S716.

For example, the double-angle corrected gradient vector vd corrected according to Equation 9 in step S714 is calculated as a gradient direction, and the sum of squares of the first and second components of the double-angle corrected gradient vector vd in step S715 is calculated as a gradient strength.

Further, when a square of the weighted average composite vector length is calculated with the gradient strength as a weight in step S716, a portion of the sum of squares of the first and second components of the double-angle corrected gradient vector vd which is shown in the middle expression can be canceled. Specifically, Equations 22 and 23 can be expressed as the following Equations 24 to 27.

$$Cvalw = \frac{\sum_{i=1}^{n} \frac{\sqrt{ap_i^2 + bp_i^2}\,\frac{ap_i^2 - bp_i^2}{ap_i^2 + bp_i^2}\,(ap_i^2 + bp_i^2)}{\sqrt{ap_i^2 + bp_i^2}}}{\sum_{i=1}^{n}(ap_i^2 + bp_i^2)} = \frac{\sum_{i=1}^{n}(ap_i^2 - bp_i^2)}{\sum_{i=1}^{n}(ap_i^2 + bp_i^2)} \quad \text{[Equation 24]}$$

$$Cvalw = \frac{\sum_{i=1}^{n}\left(1 - \frac{2b_i^2}{a_i^2 + b_i^2}\right)(a_i^2 + b_i^2)}{\sum_{i=1}^{n}(a_i^2 + b_i^2)} = \frac{\sum_{i=1}^{n}(ap_i^2 - bp_i^2)}{\sum_{i=1}^{n}(ap_i^2 + bp_i^2)} \quad \text{[Equation 25]}$$

$$Svalw = \frac{\sum_{i=1}^{n} \frac{\sqrt{ap_i^2 + bp_i^2}\,\frac{2ap_i bp_i}{ap_i^2 + bp_i^2}\,(ap_i^2 + bp_i^2)}{\sqrt{ap_i^2 + bp_i^2}}}{\sum_{i=1}^{n}(ap_i^2 + bp_i^2)} = \frac{\sum_{i=1}^{n} 2ap_i bp_i}{\sum_{i=1}^{n}(ap_i^2 + bp_i^2)} \quad \text{[Equation 26]}$$

$$Svalw = \frac{\sum_{i=1}^{n}\left(\frac{2a_i b_i}{a_i^2 + b_i^2}\right)(a_i^2 + b_i^2)}{\sum_{i=1}^{n}(a_i^2 + b_i^2)} = \frac{\sum_{i=1}^{n} 2a_i b_i}{\sum_{i=1}^{n}(ap_i^2 + bp_i^2)} \quad \text{[Equation 27]}$$

Here, the double-angle corrected gradient vector vd resulting from the correction in step S714 is used. Thus, selecting the sum of squares of the first and second components as a weight contributes to a reduction in a calculation cost, and the calculation processing can be simplified by selecting a weight in accordance with the content of the gradient direction.

Here, step S716 functions as a reliability generation step of generating the reliability based on at least one of the gradient direction corrected in the gradient correction step and the gradient strength of the local region. In addition, at this time, the reliability calculation unit 116 functions as a reliability generation unit.

Subsequently, in step S717 of FIG. 7, the CPU causes the reliability correction unit 117 to correct the reliability calculated in step S716. Specifically, first, a direction in which there is no problem even when an error occurs in matching (error tolerance direction) is acquired.

For example, when the standard image is used for parallax calculation, the parallax is not affected even when a matching result has an error in a direction (y-axis direction) orthogonal to the x-axis direction which is a pupil division direction. That is, the y-axis direction is an error tolerance direction.

Next, a gradient direction of the entire standard image is calculated. Specifically, an average value, a weighted average value, a most frequent value, or a median value of gradient directions of the respective local regions may be used as the gradient direction of the entire standard image. Here, the average value is defined by an average composite vector angle φ in Equation (12).

Next, the reliability is corrected. When the error tolerance direction is close to the gradient direction of the entire standard image, correction is performed to increase the reliability. When the y-axis direction is an error tolerance direction, the reliability is corrected to be high when the gradient direction is close to 90° or −90°. For example, when an average value of the gradient directions of the respective local regions is used, the reliability is corrected to be high when Cval is close to zero.

Note that, when correction for doubling an angle is performed in step S714, the reliability is corrected to be high when the gradient direction is close to 180°. For example, when an average value of the gradient directions of the respective local regions is used, the reliability is corrected to be high when Cval is close to −1.

Note that an experimentally determined threshold value may be used for this determination, and the reliability may be increased when it is close to the threshold value. Alternatively, it may be determined that a pixel of interest is reliable when it is determined that the reliability is sufficiently high by using the experimentally determined threshold value, and otherwise, it may be determined that the pixel of interest is not reliable.

Next, the image matching unit 140 of the present embodiment will be described. The image matching unit 140 calculates a parallax from an image set including an A image and a B image acquired using the imaging device 100.

Specifically, first, the image set including the A image and the B image acquired using the imaging device 100 is generated and acquired, and the acquired image set is stored in a main body memory (not illustrated). Processing for correcting imbalance of the amount of light which is caused mainly by vignetting of the optical system 122 may be performed on the acquired image set.

Specifically, luminance values of the A image and the B image are corrected to become substantially fixed values regardless of an angle of view based on a result of imaging a surface light source having a fixed luminance by the imaging device 100 in advance, and thus the balance of the amount of light can be corrected. Further, for example, in order to reduce the influence of an optical shot noise or the like generated in the imaging element 121, a band-pass filter or a low-pass filter may be applied to the acquired A image and B image.

Next, on the A image, an image of a partial region including a pixel (pixel of interest) for which parallax calculation is to be performed is set as a standard image, and the B image is set as a reference image. Then, a cross-correlation value between the standard image and the reference image is calculated while moving the position of the reference image in a predetermined direction.

Figure 12A:
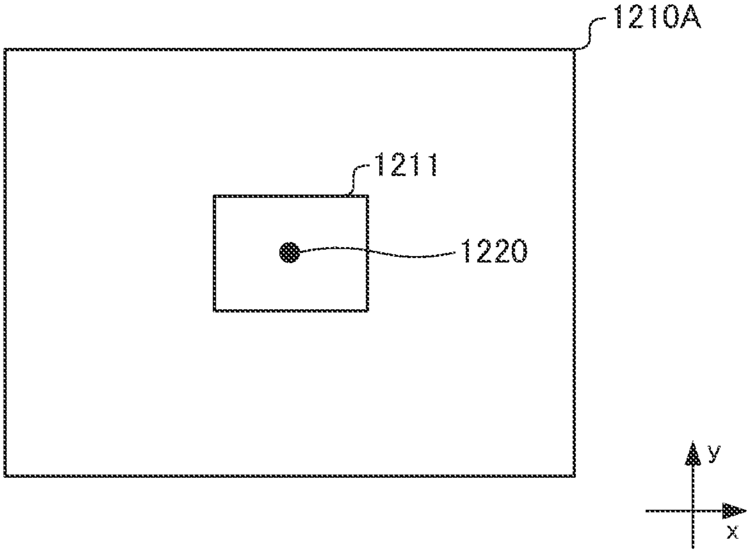
FIGS. 12A and 12B are diagrams illustrating a positional relationship between a standard image and a reference image.
Figure 12B:
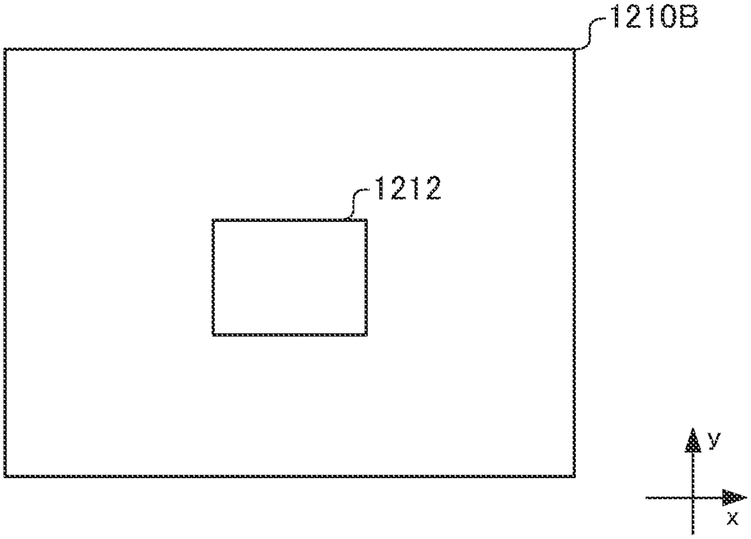

Here, FIGS. 12A and 12B are diagrams illustrating a positional relationship between the standard image and the reference image. FIG. 12A illustrates an A image 810A, and FIG. 12B illustrates a B image 1210B. The image matching unit 140 calculates a cross-correlation value between the A image 1210A and the B image 1210B.

Specifically, first, a partial region including a pixel of interest 1220 and its surrounding pixels is extracted from the A image 1210A and is set as a standard image 1211. Next, a region having the same area (image size) as that of the standard image 1211 is extracted from the B image 1210B and is set as a reference image 1212.

Thereafter, the position where the reference image 1212 is extracted is moved on the B image 1210B, and a cross-correlation value between the reference image 1212 and the standard image 1211 at each movement amount (each position) is calculated. Thereby, a cross-correlation value constituted by a correlation value data string corresponding to each movement amount is calculated.

At this time, the moving direction of the reference image 1212 may be any direction. A direction in which the reference image 1212 is moved to perform cross-correlation operation is referred to as a parallax searching direction. By setting the parallax searching direction and the pupil division direction to be the same direction, calculation to be described later can be performed easily.

The cross-correlation value may be calculated using any known method as long as the degree of correlation between the standard image 1211 and the reference image 1212 can be evaluated. For example, sum of squared differences (SSD), sum of absolute differences (SAD), and normalized cross-correlation (NCC) can also be used.

Next, a parallax value is calculated by any known method. For example, the parallax value may be a position where a cross-correlation value is a minimum. Furthermore, subpixel estimation may be performed to obtain a parallax in decimal pixel units.

For example, when a cross-correlation value is SSD, a minimum value can be obtained by performing interpolation using a quadratic function. In addition, when a cross-correlation value is SAD, a minimum value can be obtained by performing interpolation using an equiangular straight line.

Alternatively, the image matching unit 140 may calculate an optical flow between a plurality of A images or B images captured at different times. An image at an arbitrary time is set as an image 1, and an image at another time is set as an image 2.

On the image 1, an image of a partial region including a pixel (pixel of interest) for which parallax calculation is to be performed is set as a standard image, and the image 2 is set as a reference image. An optical flow can be calculated in the same manner as the parallax calculation method described above by using the standard image and the reference image.

Furthermore, the image matching unit 140 may correct a matching result using the reliability acquired using the reliability calculation device 110. For example, when the reliability of a parallax of the pixel of interest is lower than a threshold value, interpolation may be performed from results of the surroundings of the pixel of interest.

At this time, among the results of the surroundings of the pixel of interest, only results in which reliability is higher than the threshold value may be used, and processing for performing interpolation using an average value or a median value thereof may be performed. Alternatively, interpolation may be performed using a result calculated from an image captured at a time close to the time at which the image is captured. Alternatively, processing for extracting only results having a high reliability may be performed.

In the reliability calculation device of the present embodiment, an aperture problem region is determined by evaluating the uniformity of a gradient direction. According to this processing, an aperture problem region can be determined regardless of the texture of a standard image.

As a result, even when a standard image has a linear texture or includes a texture with high contrast and a texture with low contrast, it is possible to correctly determine an aperture problem region. It is possible to acquire a result of highly accurate image matching by using a reliability calculated by the reliability calculation device.

Second Embodiment

Figure 13:
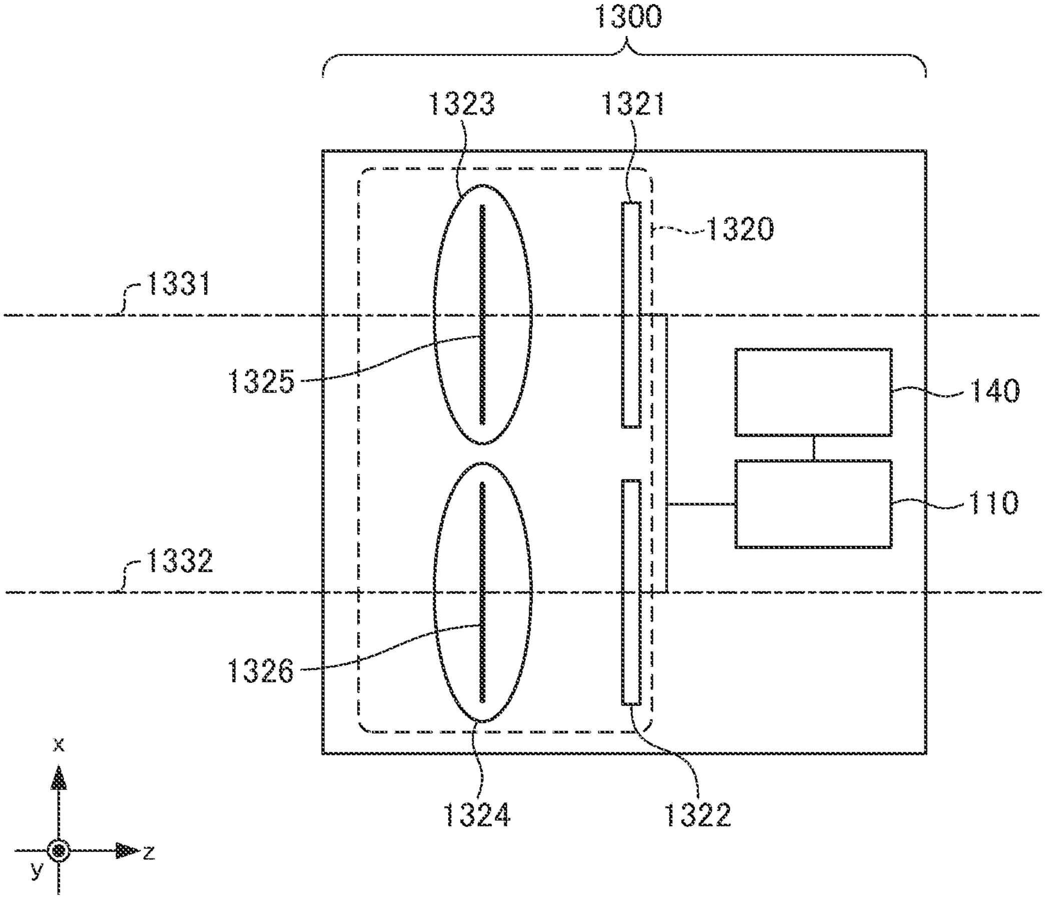
FIG. 13 is a diagram illustrating an imaging device including a reliability calculation device according to a second embodiment.

A second embodiment in which the present invention is applied to a stereo camera will be described in detail below with reference to the drawings. FIG. 13 is a diagram schematically illustrating a configuration of a reliability calculation device according to the second embodiment. Note that, in FIG. 13, the same configurations and the same portions as those described in FIG. 1 will be denoted by the same numbers as those in FIG. 1, and the description thereof is omitted.

In FIG. 13, an imaging device 1300 as a stereo camera includes a reliability calculation device 110, an imaging unit 1320, and an image matching unit 140. The imaging unit 1320 includes an imaging element 1321 as a first imaging element and an imaging element 1322 as a second imaging element.

In addition, an optical system 1323 as a first optical system that forms a subject image on the first imaging element and an optical system 1324 as a second optical system that forms a subject image on the second imaging element are provided. In addition, a first image (A image) is acquired by the first imaging element, and a second image (B image) is acquired by the second imaging element.

The optical systems 1323 and 1324 are constituted by a plurality of lens groups (not illustrated), diaphragms (not illustrated), and the like, and respectively include exit pupils 1325 and 1326 at positions a predetermined distance away from the imaging elements 1321 and 1322. At this time, the optical axes of the optical systems 1323 and 1324 are denoted by 1331 and 1332, respectively.

A parallax between images can be accurately calculated by calibrating parameters such as positional relationships of the optical systems in advance. Further, it is also possible to accurately calculate a parallax between images by correcting lens distortion in each of the optical systems.

Note that, in the second embodiment, there are two optical systems that acquire the A image and the B image that have a parallax according to a distance, but a stereo camera constituted by three or more optical systems and imaging elements corresponding to them may be configured.

In the second embodiment, the degree of freedom in designing a base line length is improved, and distance measuring resolution can be improved. As a result, a result of highly accurate image matching can be acquired.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing device through a network or various storage media. Then, a computer (or a CPU, an MPU, or the like) of the image processing device may be configured to read and execute the program. In such a case, the program and the storage medium storing the program configure the present invention.

This application claims the benefit of Japanese Patent Application No. 2022-124723, filed on Aug. 4, 2022, which is hereby incorporated by reference herein in its entirety.

What is claimed is:

1. An image processing device that generates reliability of matching between a first image and a second image, the image processing device comprising:

at least one processor; and at least one memory storing instructions, which when executed by the processor, cause the image processing device to:

set a standard image including a pixel of interest in the first image or the second image to generate at least a first pixel value change in a first direction and a second pixel value change in a second direction for each local region of the standard image;

generate a gradient direction of the local region based on the first pixel value change and the second pixel value change;

correct the gradient direction such that, when the local region is point-symmetrically moved, a gradient of said local region becomes the same value as a gradient of another local region different from said local region, wherein said another local region is a local region, among the local regions of the standard image, that corresponds to said local region when said local region is point-symmetrically moved;

generate the reliability based on the corrected gradient direction;

calculate a matching result as a parallax or an optical flow between the first image and the second image; and output, based on the reliability, execute at least one of (i) determining whether to adopt a matching result, (ii) performing interpolation of the matching result, or (iii) extracting only matching results having a reliability higher than a threshold value, and output a matching result in which erroneous matching is suppressed, wherein the correcting the gradient direction comprises correcting the gradient direction of said local region so that the gradient direction of said local region matches the gradient direction of said another local region, and wherein the outputting comprises correcting a matching result using the reliability, and, when the reliability of the pixel of interest is lower than a threshold value, performing interpolation from results of the surroundings of the pixel of interest, or performing processing for extracting only results having a high reliability.

2. An image processing device that generates reliability of matching between a first image and a second image, the image processing device comprising:

at least one processor; and at least one memory storing instructions, which when executed by the processor, cause the image processing device to:

set a standard image including a pixel of interest in the first image or the second image to generate at least a first pixel value change in a first direction and a second pixel value change in a second direction for each local region of the standard image;

generate a gradient direction of the local region based on the first pixel value change and the second pixel value change;

correct the gradient direction such that, when the local region is point-symmetrically moved, a gradient of said local region becomes the same value as a gradient of another local region different from said local region, wherein said another local region is a local region, among the local regions of the standard image, that corresponds to said local region when said local region is point-symmetrically moved;

generate the reliability based on the gradient direction and a gradient strength of the local region;

calculate a matching result as a parallax or an optical flow between the first image and the second image; and output, based on the reliability, execute at least one of (i) determining whether to adopt a matching result, (ii) performing interpolation of the matching result, or (iii) extracting only matching results having a reliability higher than a threshold value, and output a matching result in which erroneous matching is suppressed, wherein the correcting the gradient direction comprises correcting the gradient direction of said local region so that the gradient direction of said local region matches the gradient direction of said another local region, and wherein the outputting comprises correcting a matching result using the reliability, and, when the reliability of the pixel of interest is lower than a threshold value, performing interpolation from results of the surroundings of the pixel of interest, or performing processing for extracting only results having a high reliability.

3. The image processing device according to claim 1, wherein the instructions, when executed by the processor, further cause the image processing device to:

set at least two directions of the first direction along a pixel array and the second direction orthogonal to the first direction for the local region, calculate a first differential value obtained by performing differentiation processing in the first direction and a second differential value obtained by performing differentiation processing in the second direction, and generate the first pixel value change based on the first differential value, and generates the second pixel value change based on the second differential value.

4. The image processing device according to claim 3, wherein the instructions, when executed by the processor, further cause the image processing device to calculate a differential value by applying either a Sobel filter or a Prewitt filter to the local region.

5. The image processing device according to claim 3, wherein the instructions, when executed by the processor, further cause the image processing device to calculate the first differential value and the second differential value using a central differential gradient or an intermediate differential gradient of the local region.

6. The image processing device according to claim 1, wherein the instructions, when executed by the processor, further cause the image processing device to calculate the gradient direction based on the first pixel value change and the second pixel value change.

7. The image processing device according to claim 1, wherein the instructions, when executed by the processor, further cause the image processing device to calculate the gradient direction with a vector having a first component and a second component calculated from the first pixel value change and the second pixel value change.

8. The image processing device according to claim 1, wherein the instructions, when executed by the processor, further cause the image processing device to:

calculate at least one of a sum, a maximum value, an average value, a sum of squares, or a square root of the sum of squares of the first pixel value change and the second pixel value change as a weight, and perform calculation so that the reliability becomes higher as a weighted variance value in the gradient direction or a weighted standard deviation value increases.

9. The image processing device according to claim 1, wherein the instructions, when executed by the processor, further cause the image processing device to:

calculate any one of a sum, a maximum value, an average value, a sum of squares, or a square root of the sum of squares of the first pixel value change and the second pixel value change as a weight, and perform calculation so that the reliability becomes higher as a value of the weighted average composite vector length in the gradient direction or a square value of the weighted average composite vector length decreases.

10. The image processing device according to claim 1, wherein the instructions, when executed by the processor, further cause the image processing device to perform correction so that a gradient of the local region has the same value when the local region is point-symmetrically moved.

11. The image processing device according to claim 10, wherein the instructions, when executed by the processor, further cause the image processing device to correct the gradient direction by +180° or −180° so that the gradient direction falls within a predetermined usable range when it falls outside the usable range.

12. The image processing device according to claim 10, wherein the instructions, when executed by the processor, further cause the image processing device to calculate the gradient direction by narrowing a range so that the gradient direction falls within a predetermined usable range based on a ratio between the first pixel value change and the second pixel value change.

13. The image processing device according to claim 10, wherein the instructions, when executed by the processor, further cause the image processing device to correct the gradient direction based on positive or negative values of the first pixel value change and the second pixel value change.

14. The image processing device according to claim 10, wherein the instructions, when executed by the processor, further cause the image processing device to perform correction so that an angle of the gradient direction is doubled.

15. The image processing device according to claim 1, wherein the instructions, when executed by the processor, further cause the image processing device to perform calculation so that the reliability becomes higher as a variance or standard deviation of the gradient direction increases.

16. The image processing device according to claim 1, wherein the instructions, when executed by the processor, further cause the image processing device to perform calculation so that the reliability becomes higher as a value of an average composite vector length in the gradient direction or a square value of the average composite vector length decreases.

17. The image processing device according to claim 1, wherein the instructions, when executed by the processor, further cause the image processing device to correct the reliability.

18. The image processing device according to claim 17, wherein the instructions, when executed by the processor, further cause the image processing device to perform correction to increase the reliability when the gradient direction of the entire standard image is close to an error tolerance direction.

19. The image processing device according to claim 1, wherein the instructions, when executed by the processor, further cause the image processing device to generate the reliability based on a gradient strength of the local region.

20. The image processing device according to claim 1, wherein the matching is performed to calculate an optical flow between images captured at different times.

21. An imaging device comprising:
- the image processing device according to claim 1,
- wherein the instructions, when executed by the processor, further cause the imaging device to:
  - capture a subject image formed by an optical system;
  - measure a distance to a subject based on the reliability of the matching between the first image and the second image; and
  - adjust a focus of the optical system based on the distance.

22. The imaging device according to claim 21, wherein the instructions, when executed by the processor, further cause the imaging device to generate the first image and the second image.

23. The imaging device according to claim 21, further comprising:
- a first imaging element,
- a first optical system that forms the subject image on the first imaging element,
- a second imaging element, and
- a second optical system that forms the subject image on the second imaging element,
- wherein the first image is acquired by the first imaging element, and the second image is acquired by the second imaging element.

24. An image processing method of generating reliability of matching between a first image and a second image, the image processing method comprising:
- setting a standard image including a pixel of interest in the first image or the second image to generate at least a first pixel value change in a first direction and a second pixel value change in a second direction for each local region of the standard image;
- generating a gradient direction of the local region based on the first pixel value change and the second pixel value change;
- correcting the gradient direction such that, when the local region is point-symmetrically moved, a gradient of said local region becomes the same value as a gradient of another local region different from said local region, wherein said another local region is a local region, among the local regions of the standard image, that corresponds to said local region when said local region is point-symmetrically moved;
- generating the reliability based on the gradient direction corrected in the correcting of the gradient direction;
- calculating a matching result as a parallax or an optical flow between the first image and the second image; and
- outputting, based on the reliability, execute at least one of (i) determining whether to adopt a matching result, (ii) performing interpolation of the matching result, or (iii) extracting only matching results having a reliability higher than a threshold value, and output a matching result in which erroneous matching is suppressed,
- wherein the correcting the gradient direction comprises correcting the gradient direction of said local region so that the gradient direction of said local region matches the gradient direction of said another local region, and
- wherein the outputting comprises correcting a matching result using the reliability, and, when the reliability of the pixel of interest is lower than a threshold value, performing interpolation from results of the surroundings of the pixel of interest, or performing processing for extracting only results having a high reliability.

25. An image processing method of generating reliability of matching between a first image and a second image, the image processing method comprising:
- setting a standard image including a pixel of interest in the first image or the second image to generate at least a first pixel value change in a first direction and a second pixel value change in a second direction for each local region of the standard image;
- generating a gradient direction of the local region based on the first pixel value change and the second pixel value change;
- correcting the gradient direction such that, when the local region is point-symmetrically moved, a gradient of said local region becomes the same value as a gradient of another local region different from said local region, wherein said another local region is a local region, among the local regions of the standard image, that corresponds to said local region when said local region is point-symmetrically moved;
- generating the reliability based on the gradient direction and a gradient strength of the local region;
- calculating a matching result as a parallax or an optical flow between the first image and the second image; and
- outputting, based on the reliability, execute at least one of (i) determining whether to adopt a matching result, (ii) performing interpolation of the matching result, or (iii) extracting only matching results having a reliability higher than a threshold value, and output a matching result in which erroneous matching is suppressed,
- wherein the correcting the gradient direction comprises correcting the gradient direction of said local region so that the gradient direction of said local region matches the gradient direction of said another local region, and
- wherein the outputting comprises correcting a matching result using the reliability, and, when the reliability of the pixel of interest is lower than a threshold value, performing interpolation from results of the surroundings of the pixel of interest, or performing processing for extracting only results having a high reliability.

26. A non-transitory computer-readable storage medium storing a computer program including instructions executed by an image processing method of generating reliability of matching between a first image and a second image, the image processing method comprising:

setting a standard image including a pixel of interest in the first image or the second image to generate at least a first pixel value change in a first direction and a second pixel value change in a second direction for each local region of the standard image;

generating a gradient direction of the local region based on the first pixel value change and the second pixel value change;

correcting the gradient direction such that, when the local region is point-symmetrically moved, a gradient of said local region becomes the same value as a gradient of another local region different from said local region, wherein said another local region is a local region, among the local regions of the standard image, that corresponds to said local region when said local region is point-symmetrically moved;

generating the reliability based on the gradient direction corrected in the correcting of the gradient direction;

calculating a matching result as a parallax or an optical flow between the first image and the second image; and outputting, based on the reliability, execute at least one of (i) determining whether to adopt a matching result, (ii) performing interpolation of the matching result, or (iii) extracting only matching results having a reliability higher than a threshold value, and output a matching result in which erroneous matching is suppressed, wherein the correcting the gradient direction comprises correcting the gradient direction of said local region so that the gradient direction of said local region matches the gradient direction of said another local region, and wherein the outputting comprises correcting a matching result using the reliability, and, when the reliability of the pixel of interest is lower than a threshold value, performing interpolation from results of the surroundings of the pixel of interest, or performing processing for extracting only results having a high reliability.

* * * * *